United States Patent [19]

Assal et al.

[11] Patent Number: 4,868,886
[45] Date of Patent: Sep. 19, 1989

[54] COMBINED GLOBAL/SPOT BEAM CONFIGURATION FOR SATELLITE COMMUNICATIONS

[75] Inventors: Francois T. Assal; Amir I. Zaghloul, both of Bethesda, Md.

[73] Assignee: Communication Satellite Corporation, Washington, D.C.

[21] Appl. No.: 206,392

[22] Filed: Jun. 14, 1988

[51] Int. Cl.[4] .............................................. H04B 7/14
[52] U.S. Cl. ....................................... 455/12; 455/11; 455/15; 455/17; 342/354; 342/356
[58] Field of Search ................. 455/11, 226, 12, 296, 455/15, 303, 17, 240, 20, 234, 23, 273, 33, 137, 63, 138; 342/354, 356; 333/105

[56] References Cited

U.S. PATENT DOCUMENTS

| | | | |
|---|---|---|---|
| 3,331,071 | 7/1967 | Webb | 342/354 |
| 4,070,637 | 1/1978 | Assal et al. | 333/105 |
| 4,163,943 | 8/1979 | Acampora et al. | 455/63 |
| 4,259,741 | 3/1981 | Kawai | 455/12 |
| 4,503,436 | 3/1985 | Cramer, Jr. | 342/356 |

FOREIGN PATENT DOCUMENTS 0051035  3/1985  Japan ..................... 455/12

OTHER PUBLICATIONS

E. W. Matthews et al., *Technology Considerations for the Use of Multiple Beam Antenna Systems in Communication Satellites* Conference 1979, IEE MTT-5 International Microwave Symposium 5/79 Digest, Orlando, Fla., USA (Apr. 30–May 2, 1979) pp. 125–127.

*Primary Examiner*—Robert L. Griffin
*Assistant Examiner*—Michael Ricci
*Attorney, Agent, or Firm*—Sughrue, Mion, Zinn, Macpeak & Seas

[57] ABSTRACT

In antenna arrays having normally unexcited or little-excited elements, a technique for configuring the array to provide both global and spot beam coverage, wherein the normally unexcited or little-excited elements are excited at a higher level, together with other normally excited elements to provide spot beam coverage, the normally unexcited elements being left unexcited to provide global beam coverage. Ring redundancy configurations for amplifiers in a transponder provided in the configuration are optimized to minimize additional hardware requirements. The specific example of the INMARSAT II satellite system is discussed.

9 Claims, 15 Drawing Sheets

○ 43-ELEMENT ARRAY EXCITED WITH GLOBAL BEAM COEFFICIENTS, AND USED FOR BOTH GLOBAL AND SPOT BEAM

⊘ 18-ELEMENT RING #4 USED FOR SPOT BEAM ONLY

COMBINED GLOBAL/SPOT BEAM CONFIGURATION FOR SATELLITE COMMUNICATIONS

BACKGROUND OF THE INVENTION

The present invention relates to a new technique of configuring a satellite antenna array and transponder to provide either a global beam or simultaneous global and spot beams as desired, thus increasing the capacity of traffic the satellite can handle while minimizing the required amount of additional hardware. The technique will be described below in detail with reference to a particular application (the INMARSAT II satellite system), but is generally applicable to any large thinned arrays.

Telephony for aeronautical and maritime applications where the mobile earth station antenna gain is very low requires a very igh equivalent isotropic radiated power (e.i.r.p.) This requirement can severely limit the capacity which a satellite can handle, and thus can limit the amount of service which the satellite can provide. Accordingly, various approaches to modification of satellite design to provide an additional spot beam channel have been considered. The present invention has been achieved as a result of these considerations.

The INMARSAT II system provides a useful context for describing the development and implementation of the invention. The global L-band transmit antenna for the INMARSAT II system uses a 61-element array of cup dipoles, 43 of which are excited to provide a shaped global beam. 18 of the elements normally are not excited, as will be discussed below, to provide the global beam.

Figure 1:
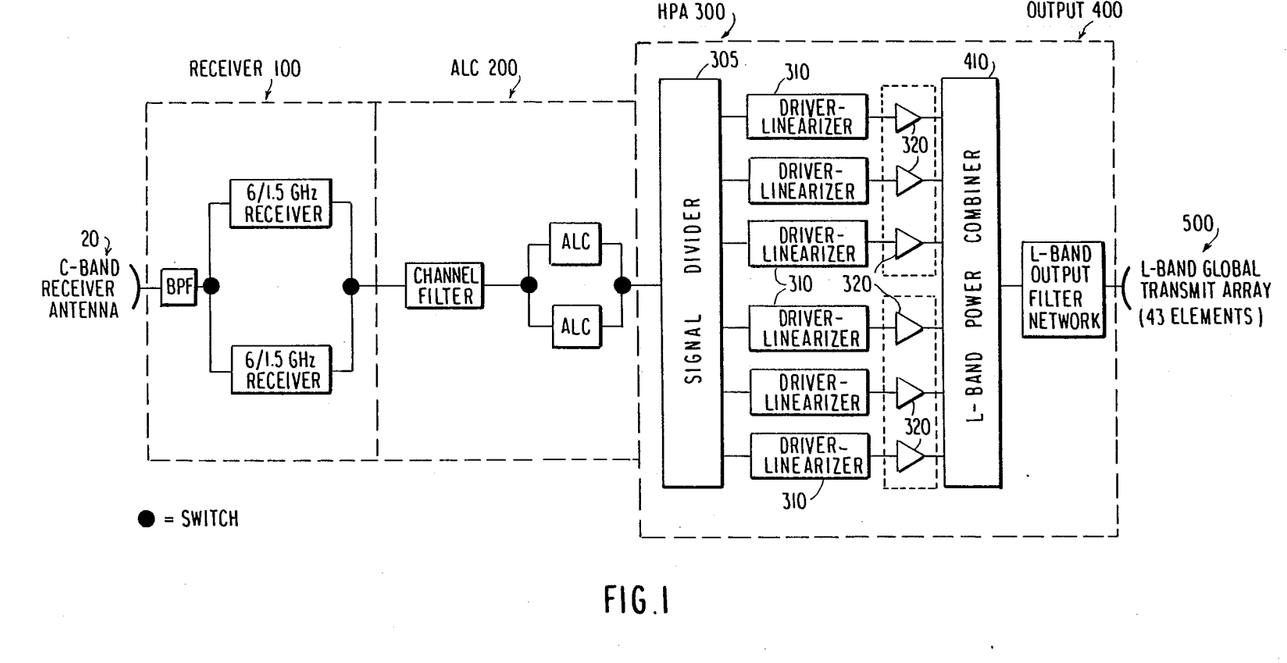
FIG. 1 shows a configuration of a C/L transponder used to provide global beam coverage.

A configuration of the transponder employed is shown in FIG. 1. The C/L transponder 10 shown uses a C band global array antenna 20 to receive the uplinks from coastal earth stations. A low noise receiver 100, comprising 6/1.5 GHz receivers 110, amplifies and downconverts the received C band signal to L band. An automatic level control (ALC) unit 200, including individual ALC circuits 210, limits the output to the high power amplifier (HPA) section 300. The L band HPA section 300 accepts the 1.5 GHz signal from the ALC 200 and divides it equally, via a passive hybrid network which is part of a signal divider 305, among inputs of four parallel-connected linearizers 310/traveling wave tube amplifiers (TWTAs) 320 arranged in two three-for-two redundant schemes. Outputs of four active HPAs are combined via another passive hybrid network which is part of an L-band power combiner 410, and the resulting signal is fed to an L band transmit array 500.

Figure 2:
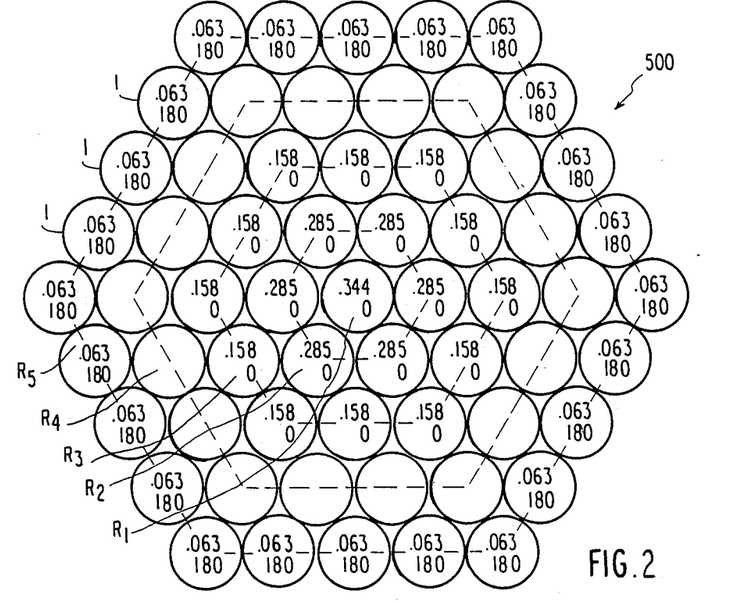
FIG. 2 shows an array configuration and excitation coefficients for global beam coverage.
Figure 3:
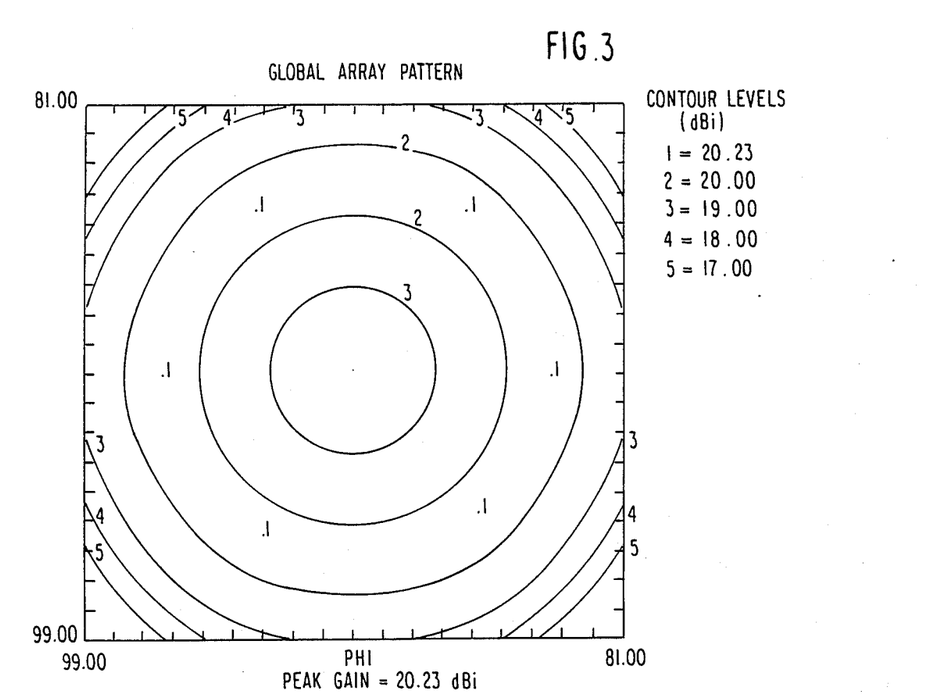
FIG. 3 shows a global array pattern achieved with the configuration of FIG. 2.

A sample configuration of the 61-element array 500, with excitation coefficients for the 43 elements, is shown in FIG. 2. In FIG. 2, there are five rings $R_1$–$R_5$ of elements 1, with the center element constituting a ring by itself. Thus, counting out from the center, FIG. 2 shows the fourth ring as having elements which normally are not excited. These elements are terminated in matched loads to preserve the mutual coupling environment in the array. A sample global array pattern for the excitation coefficients of FIG. 2 is shown in FIG. 3 which is calculated based on an embedded element pattern measured at COMSAT Laboratories, also is shown in FIG. 3. The global edge of coverage directivity is about 19.2 dBi.

Figure 4:
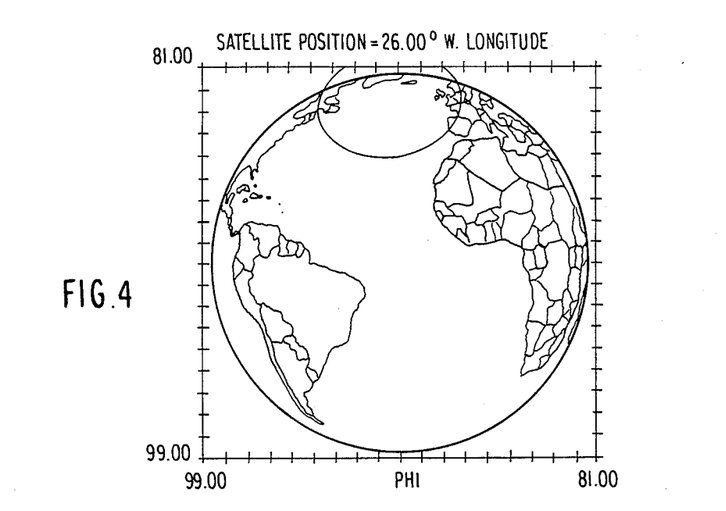
FIG. 4 shows an example of spot beam coverage in this case for the North Atlantic region.

As presently configured, the INMARSAT II system has three channels in the C/L transponder 10 (channels 2, 3, and 4). In attempting to provide a spot beam capability, the use of two channels (channels 2 and 4) was considered. These channels currently use approximately equal amplifier power outputs (45 watts), and channel 3 uses a total amplifier power output of about 90 watts, so that the output of channel 3 is substantially equal to the combined output of channels 2 and 4. The basic spot beam arrangement considered was a fixed or scannable beam having a width of about 7° in the east-west direction. A typical example is shown in FIG. 4, which shows a North Atlantic beam 5 covering the area between the North Sea (to the east) and Newfoundland (to the west).

Of the several alternatives considered, most were thought not to satisfy either cost-performance, weight-performance or complexity-performance trade-off limitations. For example, one approach which contemplated providing a separate reflector antenna to generate the spot beam, would not have required any change in the presently-configured global antenna array. However, in order for the separate antenna to be able to produce more than one beam with desired spatial isolation, a more complicated feed array and beam forming network would have been required. The diameter of the reflector also would have had to be increased to satisfy the isolation requirements.

The addition of a separate beam forming network while using the same 61-element array, also was considered, but was discarded because of problems arising from difficulty of adequate separation of global and spot beams. While using the complete array for global and spot beams would result in savings in volume taken up by the system, the global and spot beams would have to be separated either by frequency or by polarization. While achievable with current technology, this requires the use of diplexers, polarizers, or combiners behind every element, thus adding additional weight, and resulting in net loss of signal strength.

A third approach considered was to use the 18 elements in the fourth ring by itself without exciting the other 43 elements. However, the gain of this configuration was found to be too low, and further resulted in very high sidelobe levels.

SUMMARY OF THE INVENTION

It is an object of the present invention to provide both a global beam and a spot beam from the same antenna array on board a satellite while minimizing required weight and circuit complexity.

It is a second object of the invention to provide both a global beam and a spot beam from the same antenna array on board a satellite while minimizing additional power requirements.

It is a third object of the invention to make use of two of three currently-used channels of an existing satellite to selectively output a spot beam.

The present inventors have determined that the best way to provide a spot beam capability in a global beam configuration such as the INMARSAT II, while meeting gain requirements and at the same time avoiding substantial changes in design of the array and minimizing required additional mass would be to employ a mixed global/spot beam design, as follows. The global beam still can be produced using the 43-element excitation approach mentioned above. To output the spot beam, the 43 elements are used, plus the 18 elements in the fourth ring. The 43 elements are excited with the same global beam amplitude and phase coefficients. The excitation of the 18 elements in the fourth ring are used to shape and scan the beam in the required direction: the original 43 elements contribute to adding power to produce the required gain.

The invention, then, resides in part in the provision of appropriate circuitry for selectively exciting the elements of the fourth ring, and also for switching between the global and spot beam outputs as desired. Several different connection and transponder configurations have been developed. These will be described below.

With the present invention, the gain achieved in the spot beam coverage situation is sufficiently greater than that achieved in the global coverage situation. Through suitable selection of excitation coefficients for the elements of the fourth ring, sidelobe level reduction also may be achieved while retaining satisfactory gain characteristics.

BRIEF DESCRIPTION OF THE DRAWINGS

The present invention now will be described below in detail with reference to the accompanying drawings, in which.

DETAILED DESCRIPTION OF THE PREFERRED EMBODIMENTS

As mentioned above, the preferred embodiments of the invention will be provided with reference to the INMARSAT II satellite system, although the invention should not be considered as limited thereto or thereby. As presently configured, that system has three channels in the forward (C/L) transponder, namely channels 2, 3 and 4. Channel 3 has a bandwidth of about 7.3 MHz, which equals the total bandwidths in channels 2 and 4. Thus, assuming equal distribution of power density with bandwidth, the RF power in channel 3 is equal to the total RF power in channels 2 and 4.

As discussed above, FIG. 1 shows a transponder configuration in which two sets of three traveling wave tube amplifiers (TWTAs) 320 are provided in a 3-for-2 redundancy configuration. Various types of redundancy configurations are well known as exemplified by U.S. Pat. No. 4,070,637, in which one of the named inventors is an inventor of the present invention. With the 3-for-2 redundancy configurations, there are four 45-watt TWTAs 320 in a dual 3-for-2 redundancy in the base line global transponder shown in FIG. 1. Thus, 90 watts of RF power for channel 3, and 90 watts of power for channels 2 and 4 together would be required.

In the following description, it will be assumed that channels 2 and 4 will be used to achieve spot beam coverage, while channel 3 is used for global coverage. A primary requirement, which as will be seen is achieved in the present invention, is that the e.i.r.p. per channel when the channel is in spot beam mode must be at least three (3) dB higher than the e.i.r.p. in the global beam mode.

Figure 5:
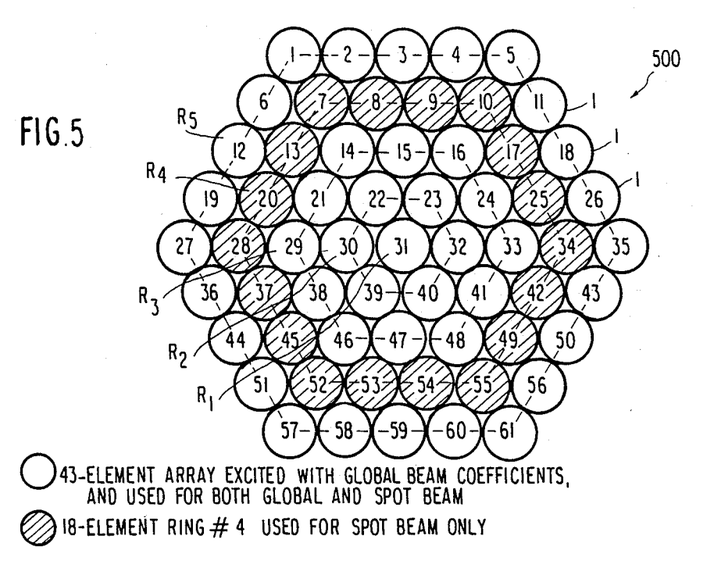
FIG. 5 shows a combined global/spot beam array configuration including identification of the fourth ring which is used to provide the spot beam.
Figure 6:
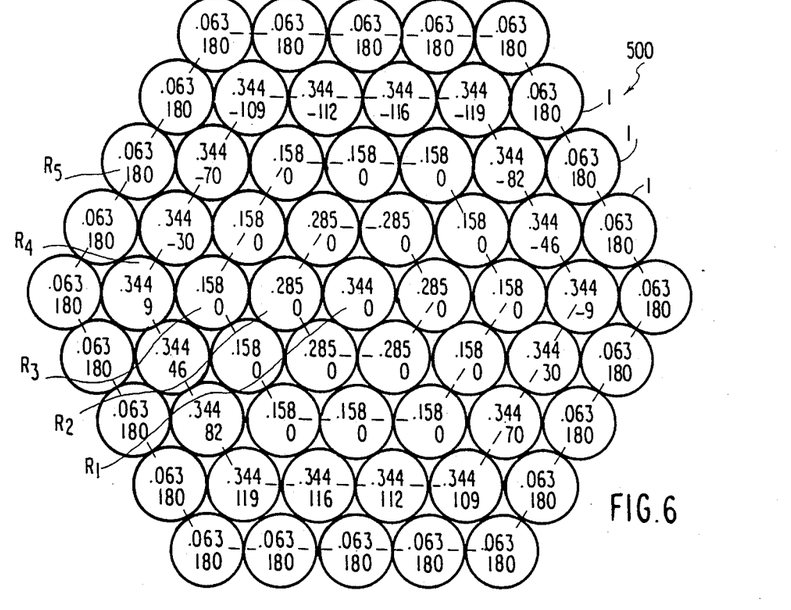
FIG. 6 shows one example of excitation of the fourth ring elements.

As seen in FIG. 5, 43 of the antenna elements 1 are used for global beam transmission, while those 43 elements and the eighteen additional elements in ring $R_4$ are used for spot beam transmission. As shown in FIG. 6 the 43 elements are excited with global beam coefficients, and are used for both global and spot beams. The fourth ring, having 18 identical elements 1, are not excited in global beam mode, but are excited with selectable excitation coefficients in the spot beam mode. FIG. 6 shows one example of the excitation of the fourth ring. The excitation coefficients, which are the voltage amplitudes to the array elements, are normalized such that the total power passing through the 43 elements add to unity. In one implementation (e.g. FIG. 6 or FIG. 8A), the elements in ring $R_4$ are excited with high amplitude coefficients approximately equal to that of the center element. Phase is selected suitably such that the entire 61 element array produces the scan spot beam. As a result, a normalized power of 2.0 passes through the fourth ring.

The present inventors have determined that reducing the amplitude of the excitation coefficients in the fourth ring has a small effect on spot beam location, size, and gain level as will be seen in the following figures. However, there is an increase in sidelobe level. This may be seen in FIGS. 8A-12A, wherein the coefficients in the fourth ring are reduced gradually relative to those of the global array.

Figure 7:
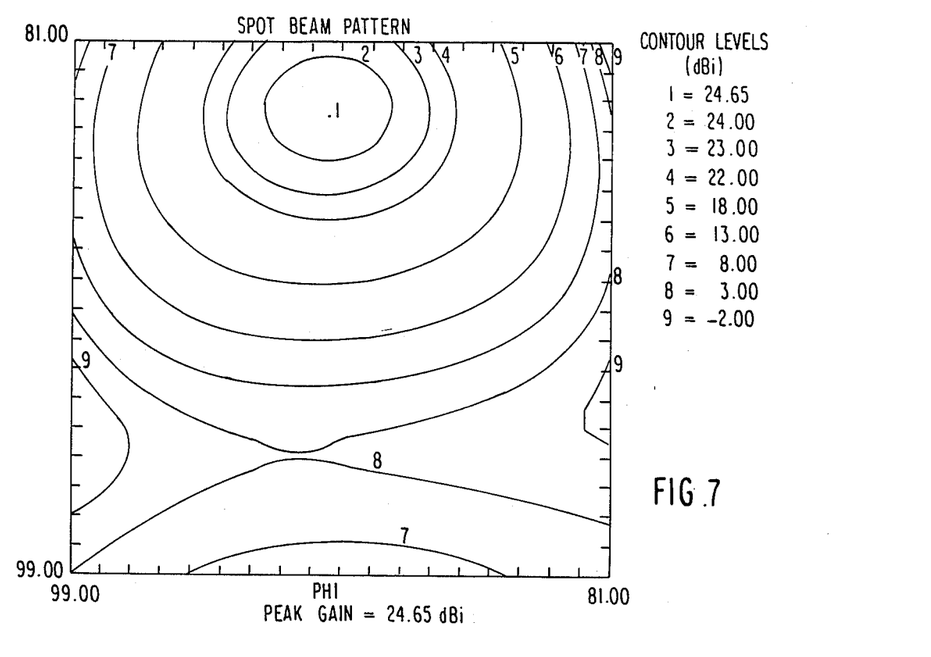
FIG. 7 shows a spot beam pattern achieved using the array configuration and excitation coefficients of FIG. 6.
Figure 8A:
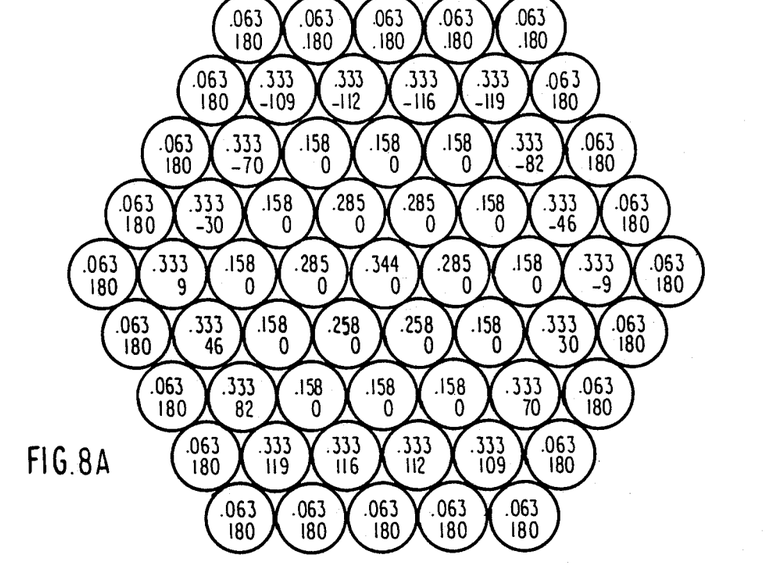
FIG. 8A shows a second set of excitation coefficients for the fourth ring.
Figure 8B:
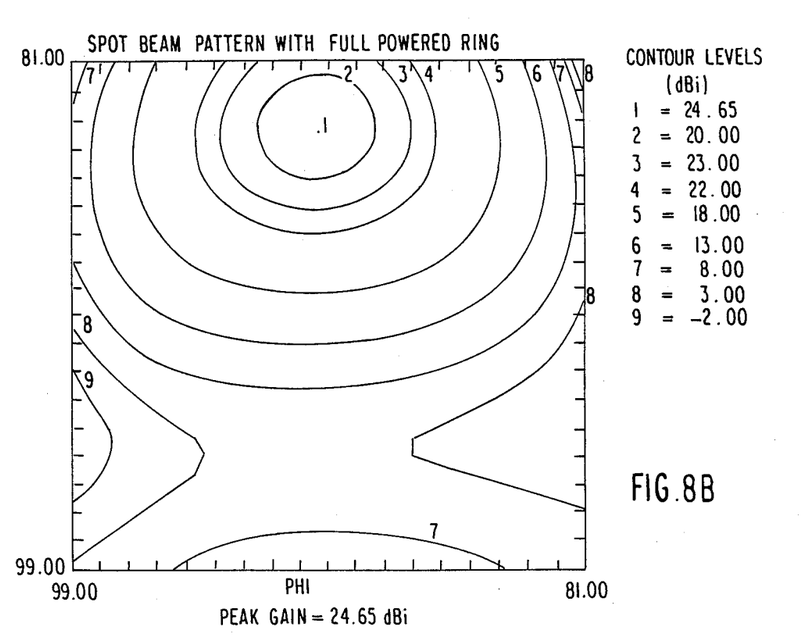
FIG. 8B shows a spot beam pattern achieved with the excitation coefficients shown in FIG. 8A.

In FIG. 8A, the coefficients in the fourth ring are reduced only slightly with respect to those in FIG. 6, so that there is no decrease in gain level, although there is a small change in sidelobe level, as seen in FIG. 8B when compared with FIG. 7.

Figure 9A:
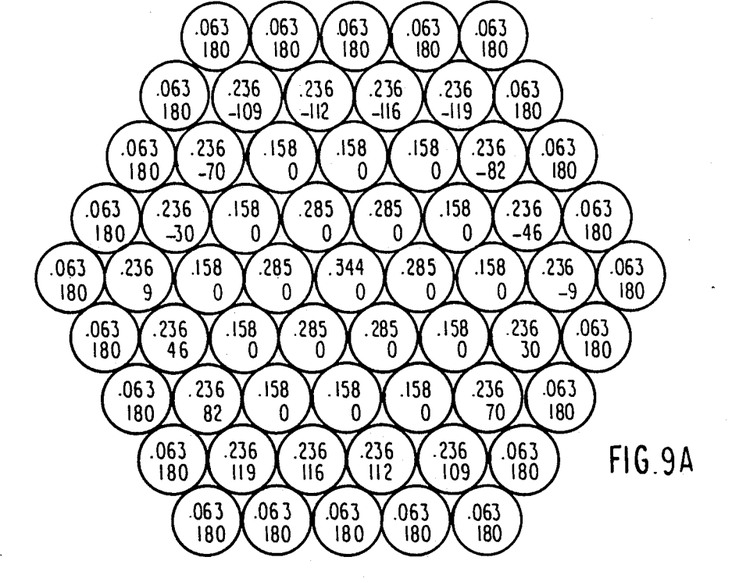
FIG. 9A shows a third set of excitation coefficients for the fourth ring.
Figure 9B:
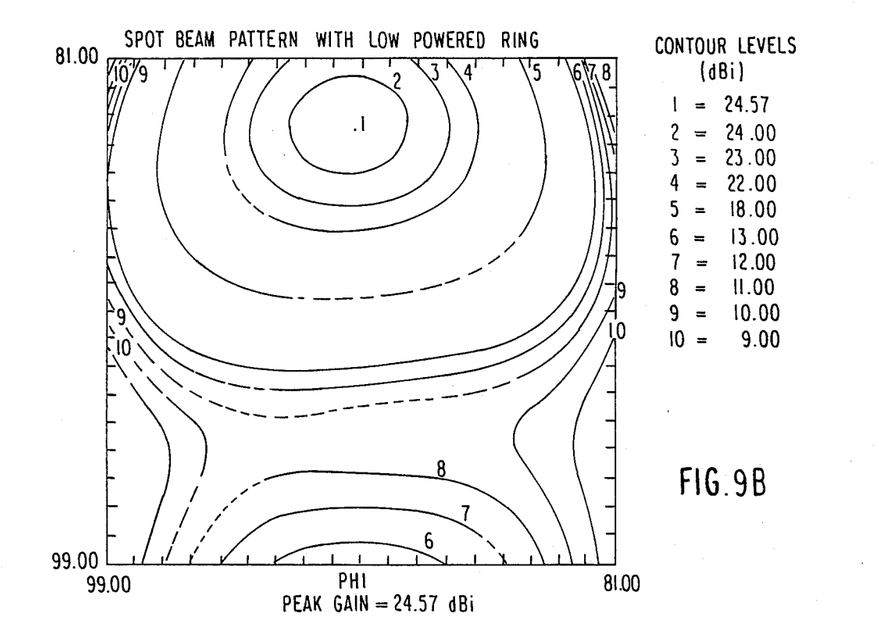
FIG. 9B shows a spot beam pattern achieved with the excitation coefficients shown in FIG. 9A.

In FIG. 9A, the coefficients in the fourth ring are decreased by a greater amount, and are excited in equal amplitudes such that the total normalized power in the fourth ring is equal to the total normalized power in the remaining rings (rings $R_1$-$R_3$ and $R_5$). According to this configuration, the spot beam has an edge gain of 23 dB, but with higher sidelobe levels when compared with what is shown in FIGS. 8B and 7.

Figure 10A:
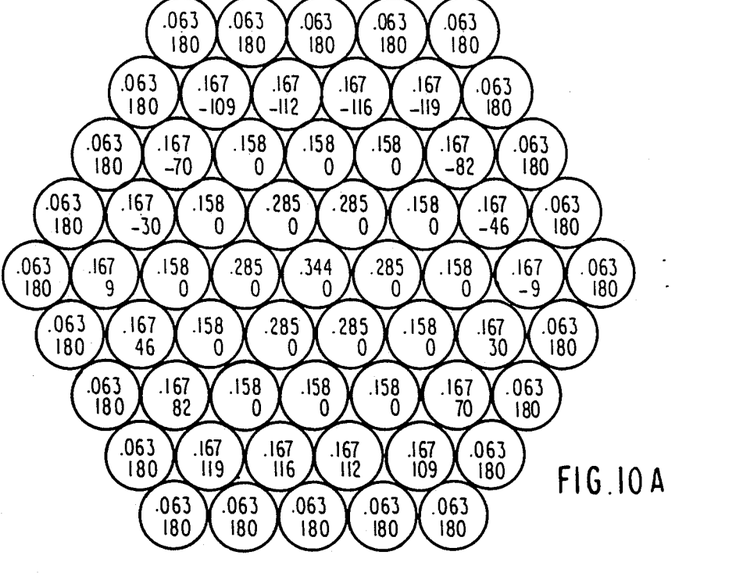
FIG. 10A shows a fourth set of excitation coefficients for the fourth ring.
Figure 10B:
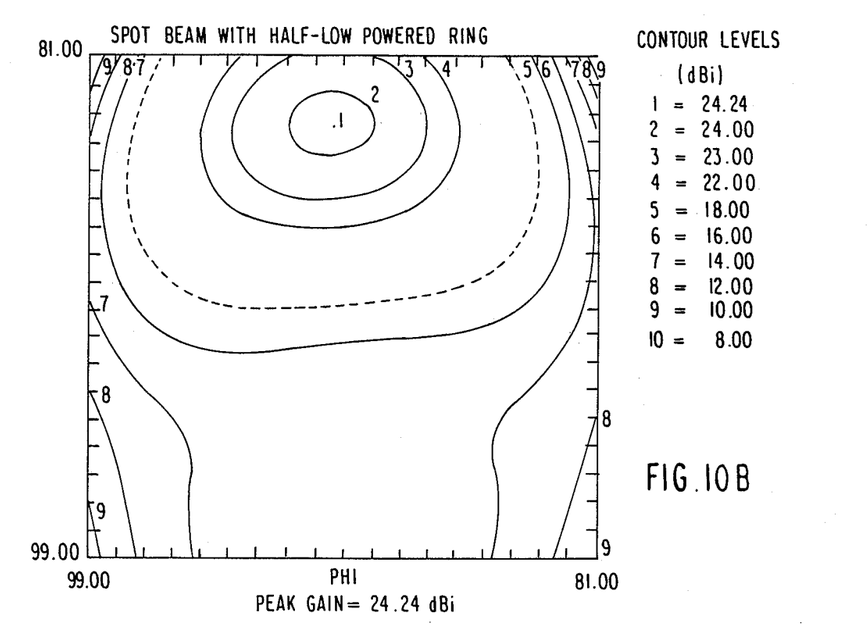
FIG. 10 shows a spot beam pattern achieved with the excitation coefficients shown in FIG. 10A.

FIG. 10A shows an array pattern in which the total normalized power in the fourth ring is equal to half of that in the global array. Again, there is not much change in the gain level, as seen in FIG. 10B, but there is an additional change in sidelobe level.

Figure 11A:
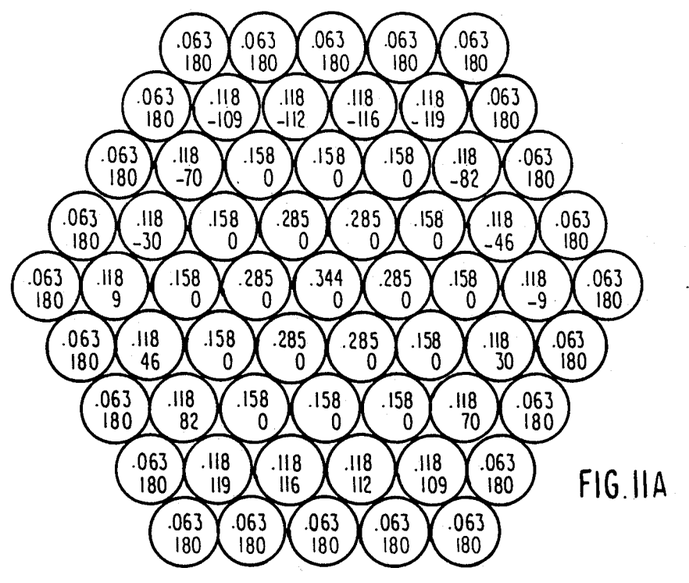
FIG. 11A shows a fifth set of excitation coefficients for the fourth ring.
Figure 11B:
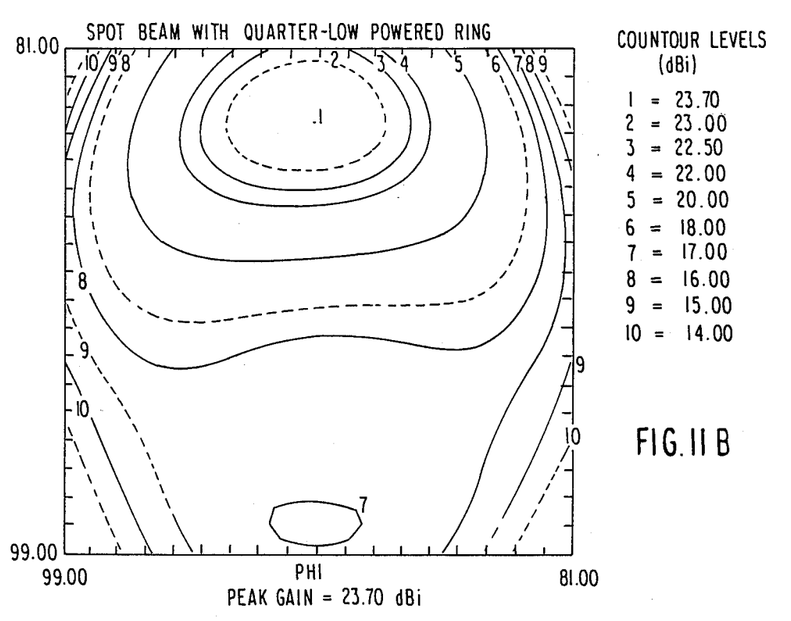
FIG. 11B shows a spot beam pattern achieved with the excitation coefficients shown in FIG. 11A.

FIGS. 11A and 11B show another configuration, in which the power in the fourth ring is reduced to ¼ that of the global array power. Again, change in sidelobe levels is clearly seen, though the change in spot beam edge gain is minimal.

Figure 12A:
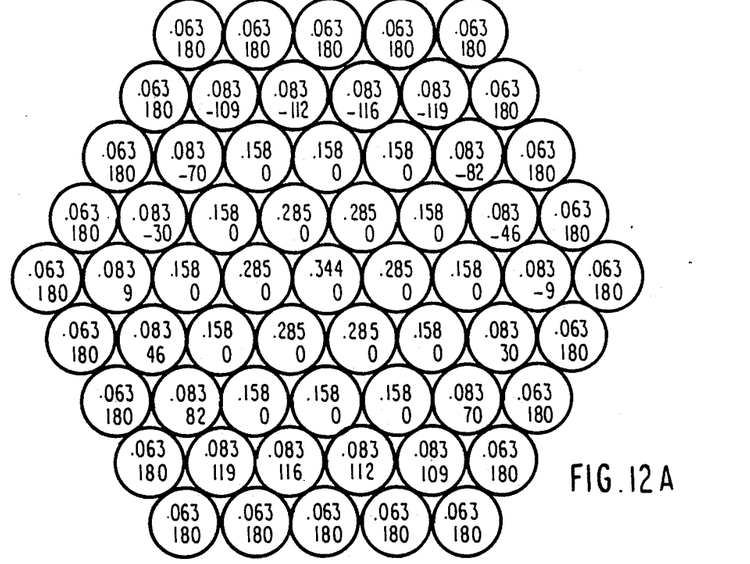
FIG. 12A shows a sixth set of excitation coefficients for the fourth ring.
Figure 12B:
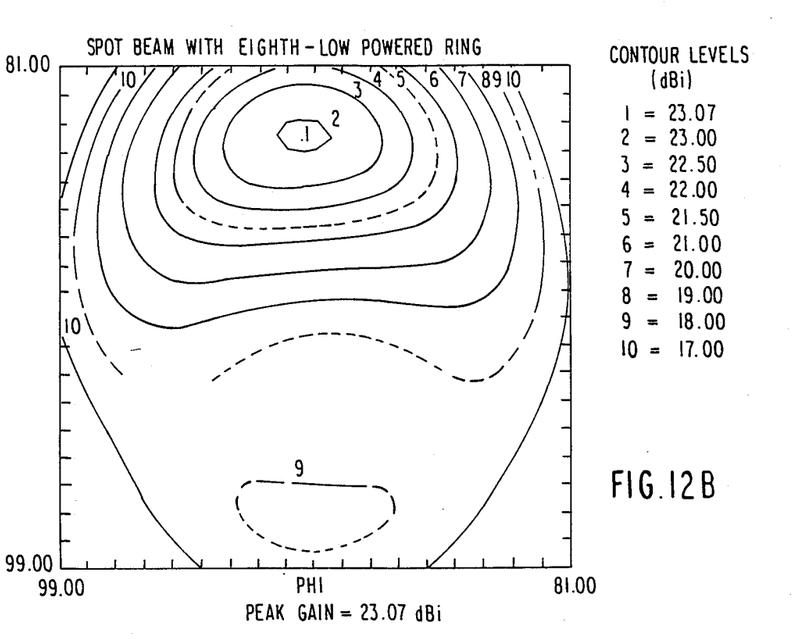
FIG. 12B shows a spot beam pattern achieved with the excitation coefficients shown in FIG. 12A.

FIGS. 12A and 12B show a configuration in which the power in the fourth ring is reduced to ⅛ of the global array power. As can be seen, the spot beam edge gain goes down slightly, but the sidelobe levels again increase. It should be noted that the peak gain decreases as the ring power decreases, indicating flatter beams within the spot beam coverage area.

Table 1 below shows a summary of spot beam pattern calculations. Case 0 is the case in which there is no spot beam (i.e. the fourth ring is not excited). Cases 1–5 correspond to the situations in FIG. 8A–12A, respectively. As can be seen, even when power transmitted through the ring is as low as ⅛ of that passing through the global array, the appropriate 3 dB increase of spot beam gain over global beam gain may be achieved.

Figure 13:
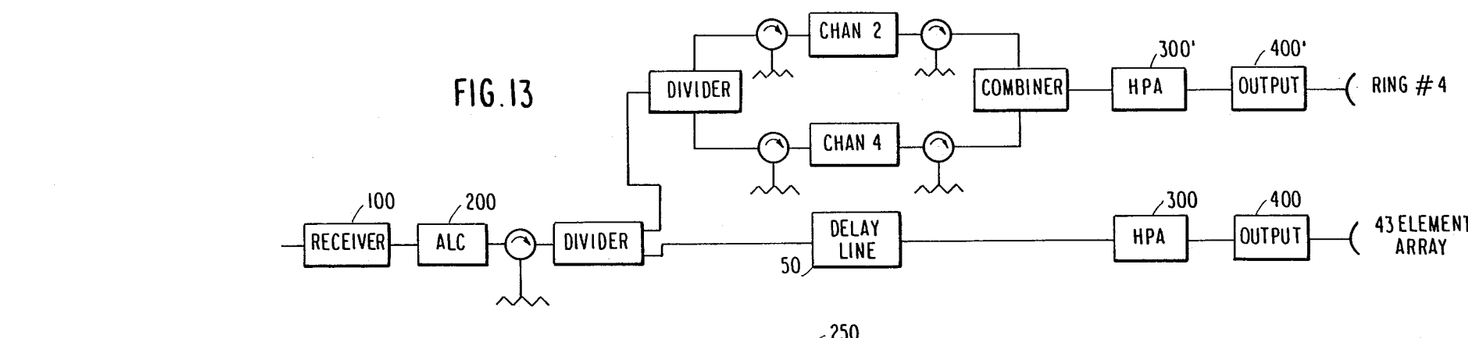
FIG. 13 shows one embodiment of a configuration for the transponder of FIG. 1 for exciting elements of the fourth ring.

Various transponder configurations are possible to achieve the results shown in FIGS. 6–12A, given the foregoing assumption that the spot beam uses channels 2 and 4 while the global beam uses channel 3 which has the same bandwidth as channels 2 and 4 combined. One configuration employs the global beam design shown in FIG. 1 with power to the fourth ring provided through a separate link using extra TWTAs. This configuration is shown in FIG. 13. The 43 element array which produces the global beam is fed through sections 100, 200, delay line 50, and sections 300 and 400 as shown. The delay line is necessitated in part by a difference in path lengths. The fourth ring, which is

TABLE 1

DIRECTIVE GAINS FOR DIFFERENT NORMALIZED POWER LEVELS IN RING #4

|  | Case 1 | Case 2 | Case 3 | Case 4 | Case 5 | Case 0 |
|---|---|---|---|---|---|---|
| Amplitude Coefficients in Ring #4 | 0.333 | 0.236 | 0.167 | 0.118 | 0.083 | 0 |
| Normalized Power in Ring #4 | 2.00 | 1.00 | 0.50 | 0.25 | 0.125 | 0 |
| Normalized Power In Global Array | 1.00 | 1.00 | 1.00 | 1.00 | 1.00 | 1.00 |
| Spot Beam Directive Edge Gain, dBi | 23.00 | 23.00 | 23.00 | 22.50 | 22.20 | 19.20 (No Spot Beam) |
| Global Beam Directive Edge Gain, dBi | 19.20 | 19.20 | 19.20 | 19.20 | 19.20 | 19.20 | used in shaping the spot beam, is fed with separate amplifiers in accordance with the cases shown in Table 1.

When an all global operation is desired, the amplifiers feeding the elements of the fourth ring are turned off. Case 0 in Table 1 corresponds to this situation. The required RF power levels and resulting incremental e.i.r.p. relative to the global beam for all of the cases are shown in Table 2 on the next page. Table 2 also indicates incremental power and mass required by the corresponding transponder modification in FIG. 13, of which only about 3 kg are necessitated by the antenna itself (additional feed network for the 18 elements). In calculating the incremental power and mass in the table, for Case 1 the use of the same two 3-for-2 redundancies as in the transponder of FIG. 1 is assumed. In Case 2, a single such redundancy is assumed, and in Cases 3–5, single 2-for-1 redundancies are assumed. Thus, Cases 3 and 4 presently considered to be the most attractive for this transponder configuration, since they require only one additional amplifier of the same power level. Accordingly, relatively high incremental e.i.r.p. is achieved in these two cases.

Figure 14:
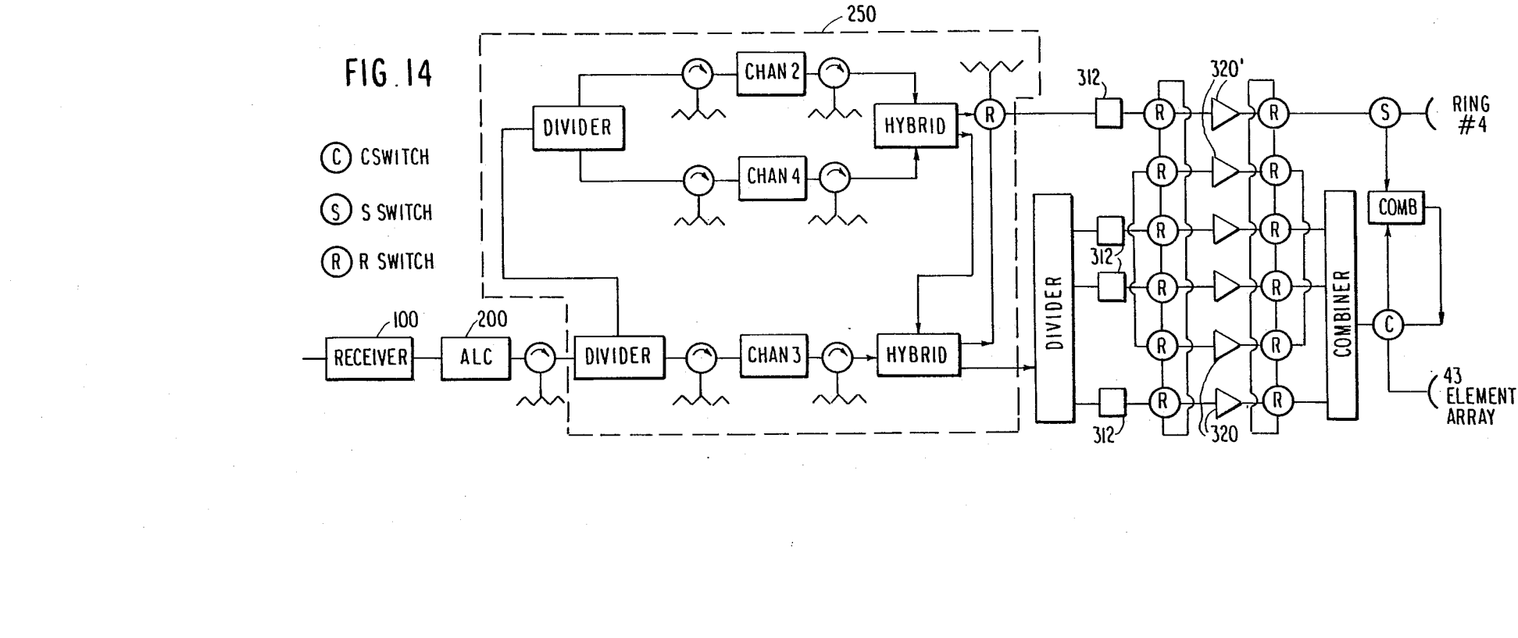
FIG. 14 shows a second embodiment of a configuration for the transponder of FIG. 1 for exciting the elements of the fourth ring.

An alternative transponder configuration involves a slight modification of the TWTA redundancy scheme shown in FIG. 1. As shown in FIG. 14, instead of providing two 3-for-2 redundancy sets 320, a single 6-for-4 redundancy configuration 320' is provided. By providing appropriate inputs to this redundancy

TABLE 2

ADD-ON TRANSPONDER AMPLIFIER LEVELS AND INCREMENTAL E.I.R.P., POWER AND MASS FOR DIFFERENT NORMALIZED POWER LEVELS IN RING #4

|  | Case 1 | Case 2 | Case 3 | Case 4 | Case 5 | Case 0 |
|---|---|---|---|---|---|---|
| Amplifier Power in 43-Element Array, Watts (Channels 2, 3 and 4) | 180. | 180. | 180. | 180. | 180. | 180. |
| Amplifier Power in Ring #4, Watts (Channels 2 and 4) | 180. | 90. | 45. | 22.5 | 11.25 | 0. |
| E.I.R.P. (Spot) - E.I.R.P. (Global), dB | 8.6 | 6.8 | 5.4 | 4.4 | 3.5 | No Spot |
| Estimated Incremental Power, Watts | 540 | 270 | 135 | 70 | 40 | N/A |
| Estimated Increment Mass, Kg. | 50 | 30 | 20 | 20 | 20 | N/A | configuration, rearrangement of the four required amplifiers can result in more efficient use of their output power. Only 90 watts of output RF power is required in the global portion of the array to produce the present e.i.r.p. across the channel 3 band. The same 43-element portion, along with the fourth ring needs to be fed across channels 2 and 4 by an amount of power totaling 90 watts, but with a ratio according to the corresponding Cases 1-5 discussed above.

In FIG. 14, channelized signals of channels 2-4 are fed to the amplifiers 320' feeding the fourth ring. When all global operation is required, the power feeding the fourth ring is simply rerouted, as shown in the block diagram, to the 43-element array, with appropriate phase attenuation through elements 312.

To achieve the alternate redundancy configuration scheme, S-switches, C-switches, and R-switches, all of which are known and available, may be employed. A C-switch is a four terminal switch in which a first terminal may be connected to each of the other 3 terminals, and in which pairs of terminals may be connected in two different ways. An S-switch is a three terminal, single pole, double throw switch which is connectable in one of two positions, a first terminal being connected to one of the second or third terminals. An R-switch is a four terminal switch in which each terminal may be connected to each other terminal, and in which pairs of terminals may be connected as desired. Examples of these switches are shown in the above-mentioned U.S. Pat. No. 4,070,637.

All of the above-mentioned switches are controllable in a known manner to provide appropriate routing of signals. For example, the S switch at the right of FIG. 14 may be controlled to reroute output of the redundancy scheme 320' to the 43 element array for the global beam pattern, rather than to ring R4 for the spot beam pattern.

Figure 15:
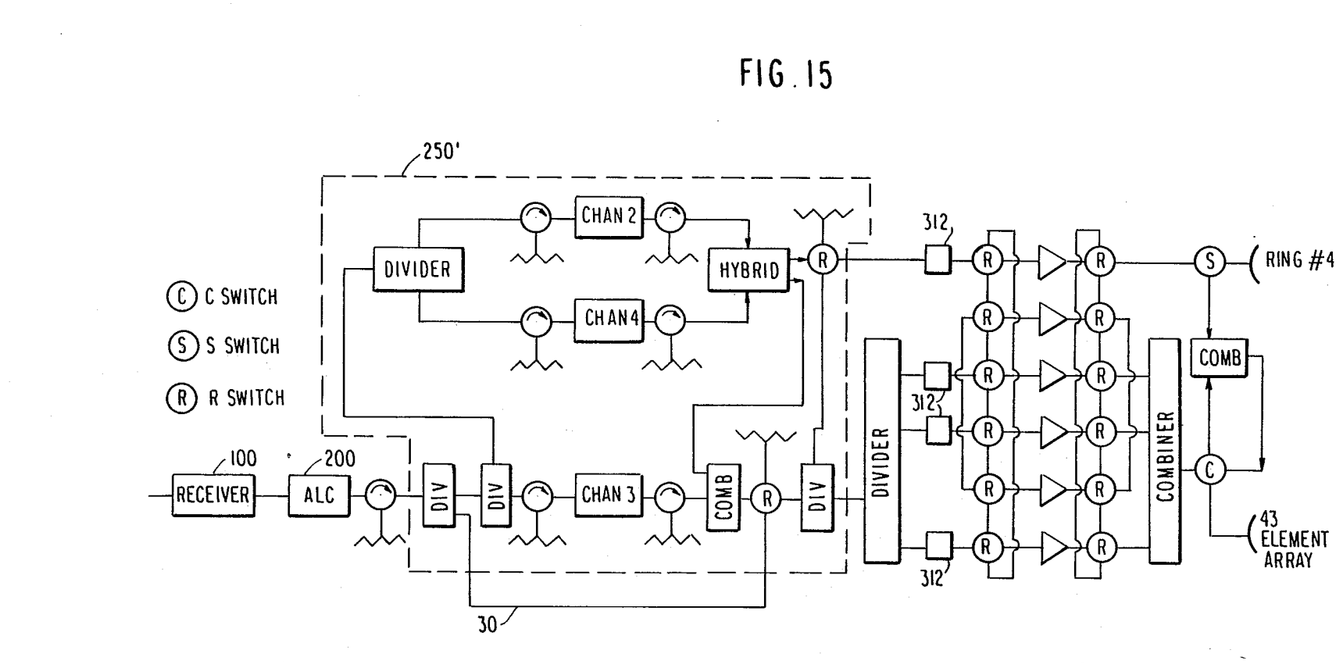
FIG. 15 shows a third embodiment of a configuration for the transponder of FIG. 1 for exciting the elements of the fourth ring.

FIG. 15 shows a configuration similar to that of FIG. 14, with a couple of exceptions. First, a bypass line 30 is shown, so that the filtering section 250 shown in FIGS. 14 and 15 may be bypassed in an all-global situation. However, this structure has the disadvantage of requiring additional dividers, a combiner instead of a hybrid, and some additional R switches, as shown.

Table 3 below shows the levels of total amplifier powers for each of Cases 0-5, in correspondence with Table 1. For channels 2 and 4, the difference in e.i.r.p. between the spot and global beams is essentially equal to the difference in beam gains since the transmitted powers are 90 watts each. Among the five cases shown, Case 2 can use the same 45-watt amplifier units which are used in the existing INMARSAT II system. Three amplifiers feed the 43-element array, while the fourth amplifier feeds the fourth ring.

Also, for Cases 1 and 3-5, similar arrangements with different amplifier levels can be devised, but Case 2 still has the advantage of using the existing 45-watt amplifiers.

Comparing Table 3 and Table 2, it can be seen that while the add-on transponder configuration of FIG. 13 provides greater difference between e.i.r.p. (spot) and e.i.r.p. (global) gain levels, it also requires higher incremental power and incremental mass. Thus, one of the trade offs between the two basic configurations is the lack of requirement for changes in present design for the add-on transponder, as opposed to decreased requirements for incremental mass in the shared system.

While the foregoing invention has been described in detail with reference to several different embodiments, various modifications within the spirit of the invention will be apparent to the ordinarily skilled artisan. For example, similar techniques employing reconfiguring of both an antenna array and a transponder to add a new beam and increase the capacity may be used in general for large thinned arrays, with minimum impact on weight and power budgets. Thus, the present invention should be considered as limited only by the scope of the appended claims which follow immediately.

What is claimed is:

1. A combined global/spot beam configuration for communications satellites, said satellites handling signals transmitted along a plurality of channels, said configuration comprising:

a low noise receiver for receiving a first signal of a first frequency and converting it to a second signal of a second frequency;

automatic level control means for adjusting a level of said second signal received from said low noise receiver and outputting a third, level-controlled signal;

a high power amplifier subsystem including a divider for receiving said third signal from said automatic level control means and dividing it into fourth and fifth signals;

means for receiving said fourth signal and for dividing said fourth signal into sixth and seventh signals, said sixth signal corresponding to a first channel, and said seventh signal corresponding to a second channel;

means for combining said sixth and seventh signals to produce a first combined signal;

TABLE 3

SHARED TRANSPONDER AMPLIFIER LEVELS AND INCREMENTAL E.I.R.P., POWER AND MASS FOR DIFFERENT NORMALIZED POWER LEVELS IN RING #4

| | Case 1 | Case 2 | Case 3 | Case 4 | Case 5 | Case 0 |
|---|---|---|---|---|---|---|
| Total Amplifier Power in 43-Element Array, Watts (Channels 2, 3 and 4) | 120 | 135 | 150 | 162 | 170 | 180 |
| Total Amplifier Power in Ring #4, Watts (Channels 2 and 4) | 60 | 45 | 30 | 18 | 10 | 0 |
| E.I.R.P. (Spot) - E.I.R.P. (Global), dB | 3.8 | 3.8 | 3.8 | 3.3 | 3.0 | No Spot |
| Estimated Incremental Power, Watts | | 0 | | | | N/A |
| Estimated Increment Mass, Kg. | | 5 | | | | N/A | six low-power R-switches and six high-power R-switches are used to replace the two low-power 2-for-3 switches and the two high power 3-for-2 switches in the present design. This is what yields the 6-for-4 redundancy which is more reliable than the two 3-for-2 redundancy sets shown in FIG. 1. As a result, variable gain and phase control elements are needed as shown in FIGS. 14 and 15 to correct for different path lengths.

Table 3 also shows that the incremental power and mass over the present all global design are minimal.

an input feed network for receiving said first combined signal and said fifth signal and providing an output accordingly;

a plurality of traveling wave tube amplifiers connected in a ring-redundancy configuration for receiving said output of said input feed network;

first and second output feed networks for receiving outputs of said plurality of traveling wave tube amplifiers and providing first and second feed network outputs accordingly; and a transmit array for receiving said feed network outputs, said transmit array being divided into first and second portions said first portion comprising elements which are energized in response to at least said first feed network output to provide a global beam, and said second portion comprising elements which are energized in response to said second feed network output, wherein both of said first and second portions are energized to provide a spot beam.

2. A configuration as claimed in claim 1, wherein said ring redundancy configuration comprises a 6-for-4 redundancy arrangement.

3. A configuration as claimed in claim 1, further comprising a bypass line between said automatic level control means and said plurality of traveling wave tube amplifiers, wherein the output of said automatic level control means passes along said bypass line to output said global beam.

4. A configuration as claimed in claim 1, wherein said transmit array comprises a plurality of elements disposed among ones of a plurality of concentric rings, elements in one of said concentric rings being unexcited for outputting said global beam, all of said elements being excited for outputting said spot beam, said configuration further comprising means for selectively exciting said elements in said one of said plurality of rings.

5. A configuration as claimed in claim 4, wherein said transmit array comprises five of said concentric rings, a first one of said rings being at a center of said transmit array and a fifth one of said rings being the most distant from said center, a fourth one of said five rings having its elements normally unexcited for outputting said global beam.

6. A configuration as claimed in claim 4, wherein said transmit array comprises 61 elements, and wherein said fourth one of said plurality of rings comprises 18 of said elements, the remaining 43 of said elements being disposed among the others of said plurality of rings.

7. A configuration as claimed in claim 1, wherein said first frequency is in a C band range, and said second frequency is in an L band range.

8. A configuration as claimed in claim 1, further comprising means for selectively turning off ones of said plurality of traveling wave tube amplifiers for outputting said global beam, and for selectively turning on said ones of said amplifiers for outputting said spot beam.

9. A configuration as claimed in claim 1, wherein energization of said first portion is the same for outputting both said global beam and said spot beam.

* * * * *

UNITED STATES PATENT AND TRADEMARK OFFICE
CERTIFICATE OF CORRECTION

PATENT NO. : 4,868,886
DATED : September 19, 1989
INVENTOR(S) : FRANCOIS T. ASSAL ET AL It is certified that error appears in the above-identified patent and that said Letters Patent is hereby corrected as shown below:

Column 1, line 19, delete "igh" and insert
--high--
Column 7, line 47, after "ring" insert
--Looking at the change in redundancy in FIGS. 14 and 15 in greater detail, in the amplifier section of the transponder,--

Signed and Sealed this

Twenty-eighth Day of August, 1990

Attest:

HARRY F. MANBECK, JR.

*Attesting Officer*    *Commissioner of Patents and Trademarks*